United States Patent [19]

Billiet

[11] Patent Number: 4,564,376
[45] Date of Patent: Jan. 14, 1986

[54] FILTER ELEMENT AND METHOD OF MAKING A FILTER ELEMENT

[75] Inventor: Colin T. Billiet, Durham, England

[73] Assignee: Domnick Hunter Filters Limited, Durham, England

[21] Appl. No.: 542,112

[22] Filed: Oct. 14, 1983

[30] Foreign Application Priority Data

Oct. 15, 1982 [GB] United Kingdom ............... 8229576

[51] Int. Cl.⁴ .......................................... B01D 46/00
[52] U.S. Cl. ......................................... 55/486; 55/498;
55/510; 55/520; 55/DIG. 5; 55/DIG. 25;
29/235; 29/451
[58] Field of Search ............... 55/486, 487, 498, 501,
55/510, 526, 527, DIG. 5, DIG. 25, 520;
210/490, 497.1, DIG. 5; 29/163.5 F, 235, 451

[56] References Cited

U.S. PATENT DOCUMENTS

| | | | |
|---|---|---|---|
| 2,829,733 | 4/1958 | Bartels et al. | 55/526 |
| 3,505,038 | 4/1970 | Luksch et al. | 55/DIG. 5 |
| 3,972,694 | 8/1976 | Head | 55/527 |
| 4,156,601 | 5/1979 | Pieciak | 210/DIG. 5 |
| 4,261,718 | 4/1981 | Garner | 55/526 |

FOREIGN PATENT DOCUMENTS

| | | | |
|---|---|---|---|
| 233351 | 2/1959 | Australia | 55/DIG. 25 |
| 2521334 | 11/1976 | Fed. Rep. of Germany | 55/527 |
| 2645634 | 11/1977 | Fed. Rep. of Germany | 55/487 |
| 832890 | 4/1960 | United Kingdom. | |
| 1041882 | 9/1966 | United Kingdom. | |
| 1540615 | 2/1979 | United Kingdom. | |
| 2084897 | 4/1982 | United Kingdom | 55/486 |

Primary Examiner—David L. Lacey
Attorney, Agent, or Firm—Henry Sternberg; Bert J. Lewen

[57] ABSTRACT

A filter element comprises coaxial inner and outer relatively rigid, permeable cylinders (5, 8), each cylinder being circumferentially continuous and sandwiched between the two cylinders, a spirally-wound cylindrical filter structure comprising a plurality of layers of microporous non-woven fibrous material (9), each pair of adjacent layers being separated by a layer of strong, fluid-permeable, flexible support material (10), the filter structure being under substantially uniform radial compression over the whole of its area. The compression is preferably such as to compress the filter structure by from 25% to 45% of its original thickness, and materially increases the efficiency of filters incorporating the structure. A method of effecting the compression during manufacture is also described.

10 Claims, 6 Drawing Figures

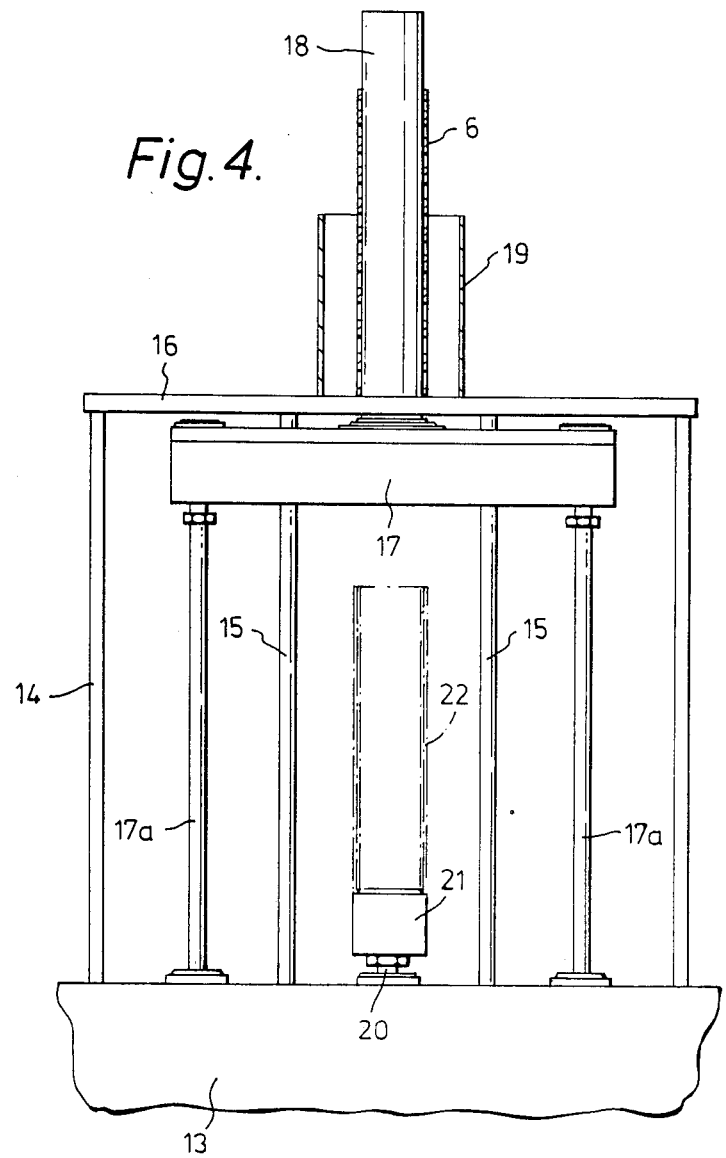

FILTER ELEMENT AND METHOD OF MAKING A FILTER ELEMENT

This invention relates to a filter element and to a method of making a filter element.

Filters for compressed air are known that have end caps sealed at opposite ends of a cylindrical wall that comprises a filter medium capable of effecting filtration of compressed air flowing radially through the wall. In filters where the air flow is from inside to outside the cylindrical wall, the compressed air to be filtered passes into the filter element through one of the end caps. Where the air flow is from outside to inside the cylindrical wall, the filtered air leaves the filter element through one of the end caps. In either arrangement the filter medium incorporated in the cylindrical wall is designed to effect the required type of filtration.

Perhaps the commonest use for this type of filter is in the removal of oil from compressed air. In this case the filter medium commonly used is an ultra high efficiency microporous filter paper that is manufactured from microfibre borosilicate glass fibres. Liquid, usually oil carried in the compressed air, coalesces during passage of the air through the filter paper and is allowed to drain from the filter, preferably through the medium of an anti re-entrainment barrier positioned around the downstream side of the filter medium. The microporous filter papers used in such filters are in themselves weak, and are generally protected from rupture and from migration of fibres by sandwiching a plurality of layers of filter papers between layers of strong, fluid-permeable, flexible support material, typically nylon or polyester non-woven fabric. In turn, the support material is generally further supported by lying in contact with a relatively rigid foraminous reinforcing cylinder at least on the downstream side of the filter assembly.

Filter constructions of this type have been successfully used for many years in the filtration of compressed air contaminated with oil aerosol. However, new applications for such filters have indicated weaknesses when there is high oil concentration (typically 6,000 to 12,000 ppm) in the air and where air flow through the filter is repeatedly initiated and stopped at intervals of only a few minutes duration. Such conditions may, for example be found in air/oil separation for oil flooded rotary vane compressors. During such conditions, and particularly on start-up and cold conditions where oil viscosity is high, the microporous filter papers tend to be compressed and to have quite a high outwardly directed hoop stress applied thereto when air flow is from inside to outside, as is conventional in this type of filtration. These conditions, since elongation at break of the filter paper is low, can lead to rupture of the filter paper, so resulting in reduced filter efficiency.

It is proposed, in GB No. 2084897A, that a stronger filter construction may be made by spirally winding a laminated body of non-woven fabric of fine glass wool and support material of rayon fabric or the like, the laminated body being sandwiched between coaxial inner and outer relatively rigid cylinders. Each layer of non-woven fabric, acting as a filter material, is relatively weak, the microfibres having an elongation to break of only 2%, but is individually supported by the adjacent layers of support material which have crush resistance and hoop stress resistance significantly greater than those of the non-woven material. The individual support thus given to each layer results in a stronger filter construction.

However, even filters based on such spirally wound constructions have difficulty in withstanding repeated stop/start conditions with high oil concentration, and the object of the present invention is to provide a filter element capable of withstanding such conditions without significant loss of filtering efficiency, together with a method of making such a filter element.

According to the invention a filter element comprises substantially coaxial inner and outer relatively rigid, permeable cylinders, each cylinder being circumferentially continuous and sandwiched between the two cylinders, a spirally-wound cylindrical filter structure comprising a plurality of layers of microporous non-woven fibrous material, each pair of adjacent layers being separated by a layer of strong, fluid-permeable, flexible support material, the filter structure being under substantially uniform radial compression over the whole of its area.

The important feature of the invention is that the filter structure is under substantially uniform radial compression over the whole of its area, that is to say the filter structure is substantially uniformly compressed between the two cylinders. This pre-compression, which takes place during manufacture of the filter, improves the ability of the filter structure to withstand compression and hoop stress while in use, without necessarily affecting the filtering efficiency of the structure. Substantial uniformity of radial compression over the whole of the area of the filter structure is important in order to achieve a uniform filtering effect. In the aforesaid British patent the relatively rigid outer cylinder is circumferentially discontinuous and the two edges of this cylinder are joined by clamping means after wrapping the outer cylinder around the filter structure. Only minimal, localised compression can be applied to the filter structure by this wrapping and clamping process, for example it is unlikely that the process will effect compression of more than about 5% from the original thickness of the filter structure, and then only in some areas. The applied pressure is not uniform and tends to be concentrated in the area of the clamp, so leading to differential filtering efficiency at different areas of the filter structure.

Preferably the degree of compression applied to the filter structure in accordance with the invention is such that the filter structure is compressed by at least 10% from its original thickness. The degree of compression is more preferably such as to compress the filter structure by from 25% to 45% from its original thickness. The compression figure is, in each case, given as the percentage by which the composite layers of microporous and support material are compressed in any sample wall section of the cylindrical filter structure.

The filter structure is conveniently formed by spirally winding adjacent and alternate sheets of microporous material and support material, desirably with the support material constituting both the innermost and outermost layers of the filter structure.

According to a further aspect of the invention a method of manufacturing a filter element comprises providing substantially coaxial inner and outer relatively rigid, permeable cylinders, each cylinder being circumferentially continuous, and sandwiching therebetween a spirally-wound cylindrical filter structure comprising a plurality of layers of microporous non-woven fibrous material, each pair of adjacent layers being separated by a layer of strong, fluidpermeable, flexible support material, in such a way as to place the filter structure under substantially uniform radial compression over the whole of its area, the degree of compression being preferably such as to compress the filter structure by at least 10%, more preferably from 25% to 45% and most desirably from 30% to 40% from its original thickness. The preferred method of effecting the axial compression is by forming the filter structure around the inner cylinder, placing the outer cylinder around the outer surface of a sleeve having inner and outer diameters that are each less than that of the original outer diameter of the filter structure, the sleeve having at one end thereof an end section tapering inwardly from an opening having an outer diameter greater that the original outer diameter of the filter structure, forcing the filter structure and inner cylinder axially into the sleeve through the opening to compress the filter structure between the inner cylinder and the sleeve, and axially removing the sleeve while holding the two cylinders and the filter structure axially in position.

Other methods of achieving radial compression of a filter structure between inner and outer circumferentially continuous cylinders are possible, for example methods involving thermal expansion and contraction, but the aforesaid method is preferred as being a simple and effective way of manufacturing the filter element.

After formation of the filter element it may be fitted with end caps using any one of a number of techniques and similarly may be embodied into a filter system in any one of a number of different ways.

In order that the invention may be better understood a specific embodiment of a filter element in accordance therewith, and a method of making such a filter element, will now be described in more detail, by way of example only, with reference to the accompanying drawings in which:

FIGS. 3 to 6 illustrate stages in manufacture of the element.

Figure 1:
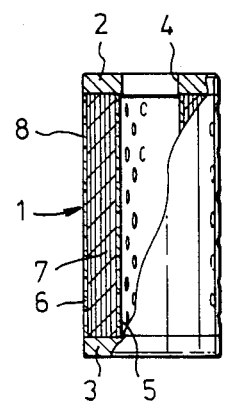
FIG. 1 is a schematic view of a filter element.

FIG. 1 shows a filter designed for the filtration of oil aerosol from compressed air. The filter comprises a cylindrical filter element 1, having end caps 2 and 3 sealed at opposite ends of the element. Such sealing may be effected in any one of a number of ways, the objective being to ensure that no leakage of air is possible through or around the axial end region of the cylindrical wall. For example, each end cap may have radially inner and outer flanges defining therebetween an annular groove within which the respective axial end of the cylindrical filter element is received. The groove has a width greater than the width of the element and a fluid-impervious sealant (typically an epoxy resin) is charged into this gap in order to fill the gap and to penetrate into the axial end regions of the element.

The filter is designed for an air flow from inside to outside, and the end cap 2 includes an air inlet 4 into the hollow body of the filter. The filter element includes an inner foraminous reinforcing cylinder 5 and an outer foraminous reinforcing cylinder 6 between which is located the filter structure 7, shown in more detail in FIG. 2. Each of the reinforcing cylinders 5 and 6 may conveniently be formed from perforated stainless steel, for example of 24 gauge thickness and with 40% open area, each cylinder being constructed to be circumferentially continuous, for example by forming a sheet into a cylinder and completing an axially extending weld along two abutting edges of the sheet. An anti re-entrainment barrier 8 is located circumferentially around the outer reinforcing cylinder 6 in order to allow coalesced liquid to drain away due to gravity. Typical materials for the anti re-entrainment barrier are polyvinylchloride coated foam and non-woven polyester material.

Figure 3:
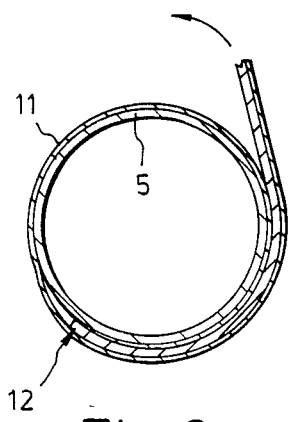
Figure 2:
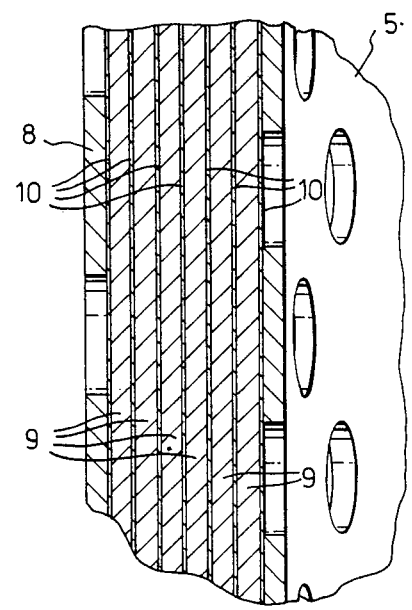
FIG. 2 is an enlarged cross-sectional view through the wall of the filter element.

FIG. 2 shows in detail the structure of the filter structure embodied in the cylindrical filter element. This is made up of a plurality of layers 9 each consisting of a single ply of microporous non-woven fibrous material, the layers alternating with layers 10 of strong, fluid-permeable, flexible support material, the whole circumferential extent of both the innermost and outermost layers being of flexible support material. The layers 9 and 10 are spirally wound around the inner reinforcing cylinder 5 as shown with reference to FIG. 3. The winding material used is a composite sheet comprising a layer of support material and a layer of microporous material, with the support material extending beyond the microporous material at the lead end of the sheet. This lead end 11 is wound around the inner reinforcing cylinder 5 for at least one and preferably two complete turns before winding of the composite sheet commences at 12, the composite sheet being then wound with the microporous material innermost so that on completion of winding the final outermost layer is of support material. Alternatively, winding of the composite sheet directly onto the reinforcing cylinder 5 may be commenced, with the support material being wound radially innermost, winding of the support material alone being effected to form the outermost layer.

Figure 5:
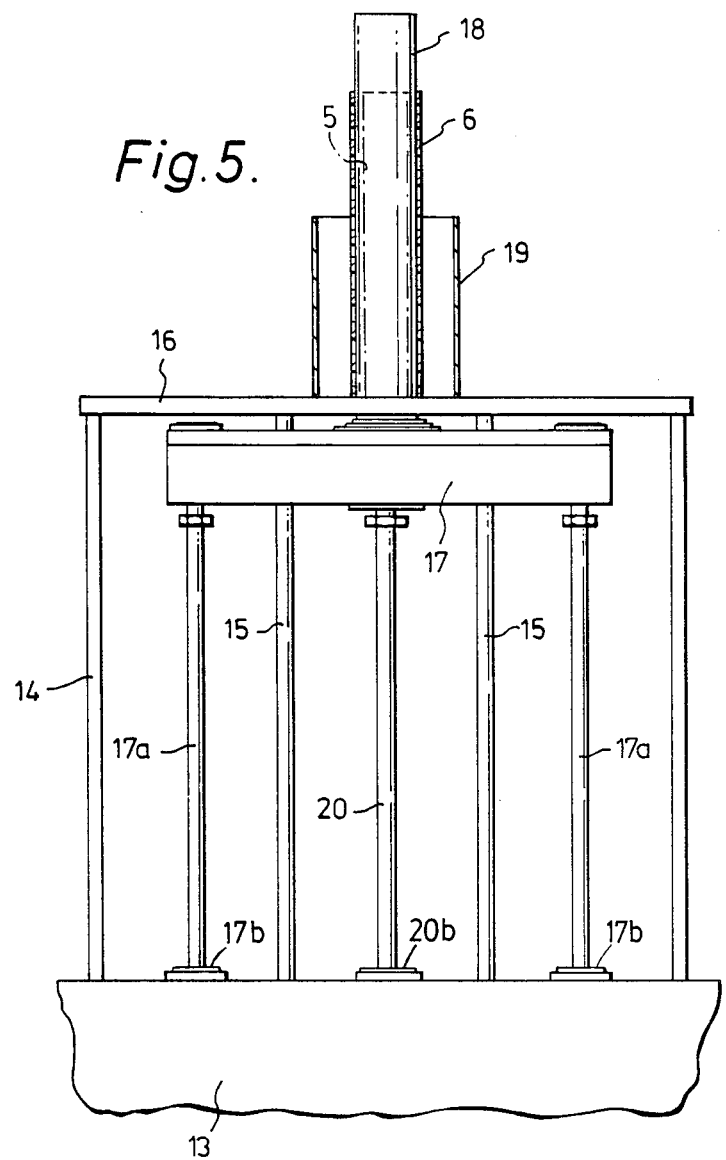
Figure 6:
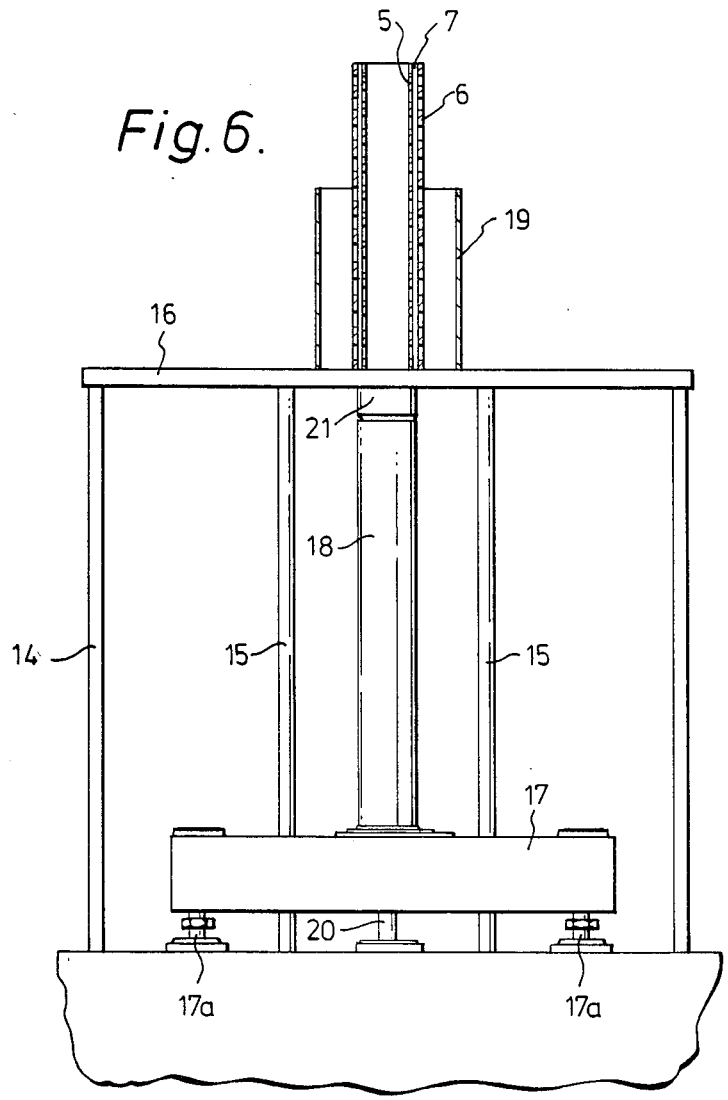

FIGS. 4 to 6 show the process of final assembly of the filter structure. The apparatus used therein comprises a fixed base 13 on which is mounted a frame 14. Vertical guides 15 extend between the top 16 of the frame and the base 13. A table 17 is guided by the guides 15 for vertical movement relative to base, such movement being effected by vertical rams 17b having piston rods 17a secured to the table and cylinders housed in the base 13. The upper surface of the table 17 has secured thereto a hollow, thin sleeve 18 having inner and outer diameters less than the outer diameter of the wound filter structure. The lower end of the sleeve 18 tapers outwardly to its lower opening, the opening being of a diameter greater than the outer diameter of the wound filter structure. A cylindrical support 19 surrounds part of the sleeve 18. Coaxially with the sleeve, and below it, there is mounted a further vertically extending ram 20b having a cylinder housed in the base 13 and a piston 20 on the upper end of which is secured a head 21 shaped to accommodate and support the lower end of the combination 22 of wound filter structure and inner cylinder.

To effect assembly, the lower end of this combination 22 is located on the head 21. The foraminous outer cylinder 6 of the filter element is placed over the sleeve 18 as shown in FIG. 4, the inner diameter of the cylinder being slightly greater than the outer diameter of the sleeve. With the table 17 and thus the sleeve 18 held in position the piston rod 20 is then moved upwardly to insert the filter structure into the sleeve, radial compression of the filter structure occurring during this insertion as the structure passes progressively through the tapered lower part of the sleeve. When fully inserted to the position shown in FIG. 5 it will be seen that the two cylinders 5 and 6 are axially coterminus and that the whole of the filter structure has been radially compressed within the sleeve 18. Thereafter with the piston rod 20 held extended, the piston rods 17a are retracted. Thus, the table 17 and sleeve 18 are moved downwardly to the position shown in FIG. 6, during which movement the filter structure expands radially into contact with the inner surface of the outer cylinder 6. The inner diameter of this cylinder is chosen so that although some expansion occurs at this stage the filter structure is, nevertheless, compressed by the required percentage from its original thickness as formed on the inner cylinder 5. The final filter element assembly comprising the two cylinders and the sandwiched filter structure may then be removed from the head 21 for subsequent fitting of the end caps. The rams are then returned to their original positions shown in FIG. 4 ready for assembly of a further element.

The preferred microporous material that is used in the filter is micro fibre borosilicate glass fibres in non-woven form which may, depending on the application, be impregnated with an organic binder, usually a synthetic resin binder. The uncompressed thickness of each micro-fibre layer may typically be from 0.4 mm to 1.00 mm. The support material is desirably nylon or polyester non-woven fabric although other materials could readily be used. The number of layers of microporous material and accordingly of support material, that need to be used depend upon the conditions for which the filter is designed and on the thickness of the individual layers. Constructions that will commonly be used will include three or more layers of microporous material. Each layer of microporous material is desirably constituted by a single ply of microporous material in order that the maximum individual layer support effect is achieved. Layers comprising two or more plies of microporous material could be used, but it will be appreciated that as the thickness of individual microporous layers increases so those layers become more susceptible to hoop stress damage.

In a specific example a filter was constructed as aforesaid, with seven layers of bonded nylon support material 10 and six layers of microfibre filter material 9. The thickness as wound on the inner cylinder 5 was 7 mm. After compression and removal of the sleeve 18 the filter assembly was left compressed between the inner cylinder 5, which was 53 mm in outer diameter, and the outer cylinder 6, which was 62 mm in inner diameter. The thickness of the filter assembly was thus 4.5 mm, a reduction in thickness of 35.71%.

Comparative tests were run between filters made in accordance with the preceding paragraph and conventional filters made by spirally winding identical nylon support material and microfibre filter material onto an identical foraminous inner cylinder. The thickness as wound of the filter structure was 7 mm, and an outer cylinder having an inner diameter of 7 mm was secured around the filter structure. There was thus little, if any, compression of the filter structure.

A test system was designed to simulate stop/start conditions in an oil flooded compressor. This comprised a compressed air supply connected through a valve to an oil lubricator, the oil-laden air from which was then passed through the filter under test, travelling from the inside to the outside of the filter. The test conditions were set so that the pressure drop across the filter (measured by a differential pressure gauge) was 30 psi, which is a typical actual value experienced when a filter is connected downstream of a rotary-vane oil flooded compressor. The valve was controlled by an electronic timer to switch over three times per second, thus simulating 10,800 stop/start cycles per hour.

Failure of a filter on test was observed from marked contamination of the air leaving the filter, and confirmed by then connecting the filter downstream of an actual compressor and checking the oil carryover through the filter. The carryover upper limit is considered to be 5 ppm (parts per million oil in air by volume) and if carryover was higher than this the filter was considered failed. Twenty conventional spirally wound filters as described were tested and without exception were found to fail after 1000–1500 cycles of the test equipment. In contrast, thirty filters in accordance with the invention were tested and showed no sign of failure even after 1,500,000 test cycles, an extremely surprising and significant improvement over the conventional filters.

The performances of the conventional filters and of filters according to the invention were also tested in actual service downstream of an oil flooded compressor. Conventional filters were found to fail at from 1000–1500 stop/start cycles, correlating well with the test results. Filters according to the invention showed no sign of failure after 100,000 stop/start cycles. This represented approximately 8,000 hours of continuous testing and only time prevented further testing to limits similar to those achieved using the test system.

The filter as described is designed for use with an air flow that is from inside to outside the filter material and in use, contaminated air flows into the filter through one of the end caps and out through the walls of the filter. During passage through the walls oil and other liquid present in the air coalesces and enters the anti reentrainment barrier from whence it drains under gravity. Clean, filtered air thus leaves the system. The prestressing of the helically wound alternating constructions of microporous filter paper and relatively strong support material leads to a filter that can withstand very high adverse hoop stress loading conditions to which the filter may be subjected, and that makes the filter particularly suitable for use in a stop/start high oil loading environment.

I claim:

1. A filter element comprising substantially coaxial inner and outer relatively rigid, permeable circumferentially continuous cylinders defining therebetween an annular space having a given radial dimension, and a spirally-wound cylindrical filter structure sandwiched in said annular space between said two cylinders, said filter structure comprising a plurality of layers of microporous non-woven borosilicate glass fibre material, each pair of adjacent layers being separated by a layer of strong, fluid-permeable flexible support material, said cylinders being positioned so as to maintain said filter structure under substantially uniform radical compression over the whole of its area, and said filter structure having a wall thickness in uncompressed condition thereof such that the difference between said wall thickness in uncompressed condition and said given radial dimension of said annular space is from 25% to 45% of said wall thickness of said filter structure in uncompressed condition so that said filter structure is compressed from 25% to 40% of its original thickness.

2. A filter element according to claim 1 wherein the difference between said wall thickness in the uncompressed condition and said given radial dimension is from 30% to 40% so that said filter structure is compressed from 30% to 40% of its original thickness.

3. A filter element according to claim 1 in which said adjacent layers of alternate sheets of microporous material and support material are together spirally wound to form said filter structure.

4. A filter element according to claim 3 wherein said support material is positioned as both the innermost and outermost layers of the filter structure.

5. A filter element according to claim 1 in which the filter structure comprises at least three layers of the microporous material.

6. A method of manufacturing a filter element, comprising providing substantially coaxial inner and outer relatively rigid, permeable cylinders, each cylinder being circumferentially continuous, forming, around said inner cylinder, a spirally-wound cylindrical filter structure comprising a plurality of layers of microporous non-woven borosilicate glass fibre material, each pair of adjacent layers being separated by a layer of strong fluid-permeable, flexible support material, compressing the walls of said cylindrical filter structure by an amount of from 25% to 45% of its original wall thickness by placing the filter structure under substantially uniform radial compression over the whole of its area and sandwiching said filter structure between said inner and outer cylinders in said compressed state thereof.

7. A method according to claim 6 in which the sandwiching step is such that the filter structure is compressed by from 30% to 40% from its original thickness.

8. A method according to claim 6 in which the radial compression is effected by forming the filter structure around the inner cylinder, placing the outer cylinder around the outer surface of a continuous sleeve having inner and outer diameters that are each less than that of the original outer diameter of the filter structure, the sleeve having at one end thereof an end section tapering inwardly from an opening having an outer diameter greater than the original outer diameter of the filter structure, forcing the filter structure and inner cylinder axially into the sleeve through the opening to compress the filter structure between the inner cylinder and the sleeve, and axially removing the sleeve while holding the two cylinders and the filter structure axially in position.

9. A method according to claim 6 in which the filter structure is formed by spirally winding adjacent and alternate sheets of the microporous material and the support material until at least three layers of the microporous material are present in the filter structure.

10. A method according to claim 6 in which the support material forms the innermost layer and the outermost layer of the filter structure.

* * * * *